United States Patent [19]

Nagamine et al.

[11] Patent Number: 5,246,796
[45] Date of Patent: Sep. 21, 1993

[54] NONAQUEOUS-ELECTROLYTE SECONDARY CELL

[75] Inventors: Masayuki Nagamine; Naoyuki Date; Tomoaki Sato, all of Fukushima, Japan

[73] Assignee: Sony Corporation, Tokyo, Japan

[21] Appl. No.: 815,058

[22] Filed: Dec. 27, 1991

[30] Foreign Application Priority Data

Dec. 28, 1990 [JP] Japan ................................ 2-416914

[51] Int. Cl.$^5$ ............................................ H01M 4/62
[52] U.S. Cl. ...................................... 429/194; 429/217
[58] Field of Search ............... 429/194, 217, 218, 232

[56] References Cited
U.S. PATENT DOCUMENTS 4,945,014  7/1990  Miyabayashi et al. .............. 429/218
4,978,600 12/1990  Suzuki et al. ...................... 429/218
4,980,250 12/1990  Takahashi et al. ............. 429/218 X
4,990,414  2/1991  Matsui et al. ...................... 429/217

Primary Examiner—Stephen Kalafut
Attorney, Agent, or Firm—Hill, Steadman & Simpson

[57] ABSTRACT

A nonaqueous-electrolyte secondary cell is disclosed which comprises a positive and negative electrode and nonaqueous electrolyte. Each of the negative and positive electrode is formed of electrode mix layer comprises a binding agent and active material carrier or active material. The electrodes are thus formed to satisfy the intensity ratio (I1/I2) of a first peak (P1) near a diffraction angle of 17.7° to a second peak (P2) near a diffraction angle of 18.5° in an X-ray diffraction pattern obtained with the CuK$\alpha$ radiation for the electrode mix layer is from 0.3 to 0.6.

4 Claims, 4 Drawing Sheets

NONAQUEOUS-ELECTROLYTE SECONDARY CELL

BACKGROUND OF THE INVENTION

This invention relates to a nonaqueous-electrolyte secondary cell comprising a negative electrode, a positive electrode and a nonaqueous-electrolyte, in which at least one of the negative and positive electrodes contains a binding agent and an active-material carrier or active material.

The remarkable progress of electronics technology in recent years has been realizing more smaller and lighter-weight electronic apparatuses one after the other. Accompanying the achievement, there has been a demand for cells or batteries, for use as a portable power supply, which are more smaller in size, higher in weight and higher in energy density.

Hitherto, secondary cells or batteries for general use have mainly been those based on aqueous solution system, such as lead batteries and nickel-cadmium (Ni-Cd) batteries. These batteries, though having excellent cycle characteristics, are not quite satisfactory as to battery weight or energy density.

Recently, many researches and developments have been made of secondary cells using a nonaqueous liquid electrolyte and using lithium or a lithium alloy as the negative electrode, as a substitute for the lead cells and nickel-cadmium cells which are unsatisfactory with respect to battery weight or energy density.

The nonaqueous-electrolyte cells have the excellent features of high energy density, little self-discharge and small weight. This type of cells, however, have the drawback that as the charge-discharge cycle is repeated, crystals of lithium will grow in dendritic form at the negative electrode at the time of discharge and the dendritic crystals will reach the positive electrode, probably resulting in internal short-circuit. This drawback has been a major hindrance to putting the nonaqueous-electrolyte cells into practical use.

In nonaqueous liquid electrolyte secondary cells using a carbon material as a carrier for a negative electrode-active material at the negative electrode, on the other hand, lithium preliminarily carried on the carbon material by a chemical or physical method, lithium contained in the crystal structure of a positive electrode-active material and lithium dissolved in the liquid electrolyte are each doped into portions between carbon layers at the negative electrode and released from the portions, at the times of charging and discharging. Therefore, repetition of the charge-discharge cycle will not cause the deposition of dendritic crystals on the negative electrode at the time of charging Thus, this type of secondary cells will hardly suffer internal short-circuit, and will exhibit good charge-discharge cycle characteristics. These secondary cells also have high energy density and small weight, and developments are in progress toward practical use of the cells.

Applications for the nonaqueous liquid electrolyte secondary cells as mentioned above include video cameras, lap-top personal computers, etc. Because most of these electronic apparatuses consume comparatively large quantities of electric power, the cells or batteries for such use should be able to endure heavy loads.

Therefore, an effective construction for such cells is a spirally wound electrode body structure formed by coiling a web form positive electrode and a web form negative along their longitudinal direction, together with a web form separator sandwiched therebetween. The cells of the wound electrode body structure can have large electrode areas and can therefore endure heavy-load uses.

In the wound electrode body as above, it is desirable to make the electrodes thinner, so as to attain larger electrode areas and pack a larger amount of the active material or active-material carrier in a limited space. For this purpose, it is desirable that the web form electrodes be produced by a process using a paste (or slurry). The process comprises the steps of mixing a binding agent, an active material (or an active-material carrier) and the like to prepare an electrode mix, dispersing the electrode mix in a solvent to obtain an electrode mix slurry, applying the slurry to an electrode collector, and drying the applied slurry to form an electrode mix layer on the electrode collector. According to the process, it is possible to form the electrode mix layer in the web form electrode in a thickness of several micrometers to several hundreds of micrometers.

In order to provide a secondary cell or battery showing excellent performance for a long time when used as a power supply for electronic apparatus as mentioned above, it is necessary to minimize the lowering in capacity attendant on the repetition of the charge-discharge cycle.

With respect to the capacity, the nonaqueous liquid electrolyte secondary cells according to the prior art have not necessarily had satisfactory performance.

As the binding agent in the electrode mix, polyvinylidene fluoride (PVDF) is preferred in view of its good solubility in solvents and its ability to offer excellent performance by being used in a comparatively small amount. However, the drying temperature for the electrode mix slurry, containing the PVDF as the binding agent, has been set comparatively high (e.g., 170° to 180° C. or above) in order to remove as rapidly and effectively as possible the solvent used to prepare the slurry.

OBJECT OF THE INVENTION

Figure 1:
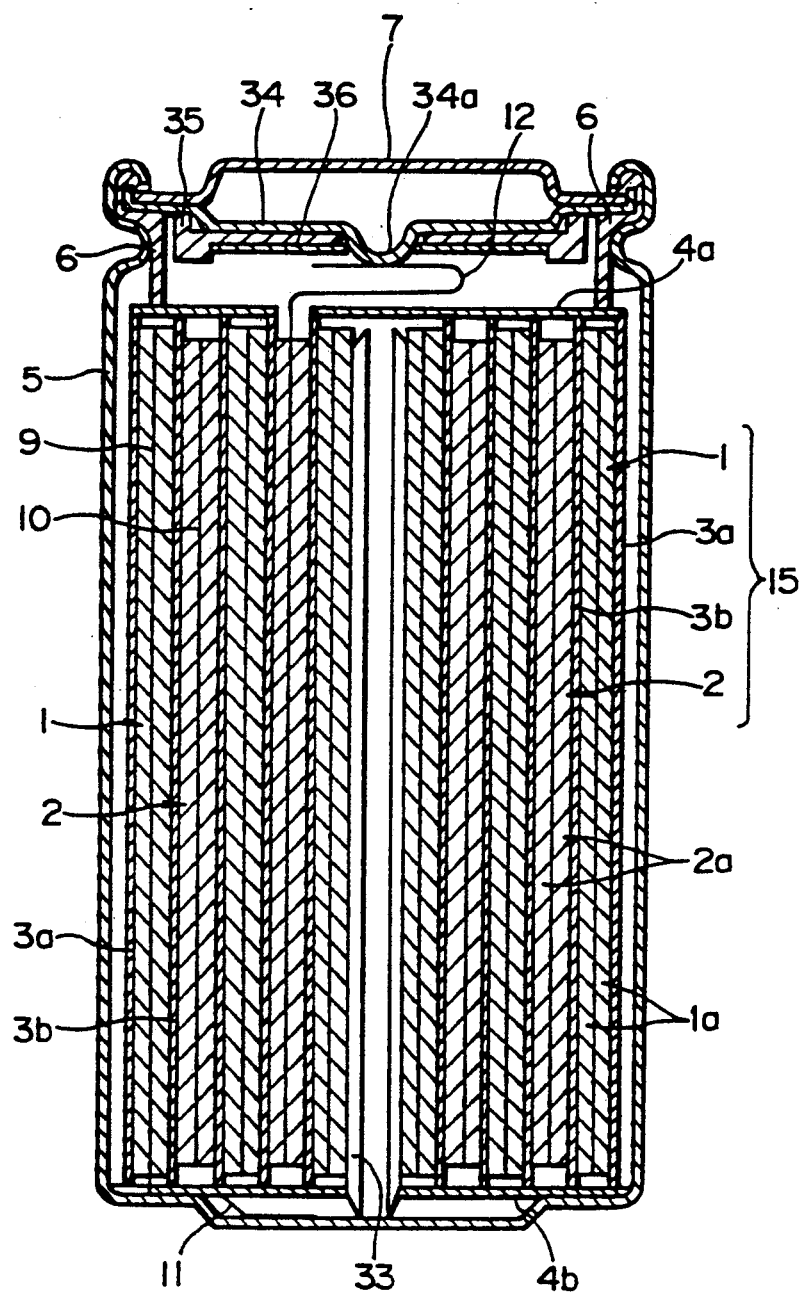
FIG. 1 is a schematic vertical section of a cylindrical nonaqueous-electrolyte secondary cell according to one embodiment of this invention.

It is an object of the present invention to provide a nonaqueous-electrolyte secondary cell which is improved in charge discharge cycle characteristics.

It is another object of the present invention to provide a nonaqueous electrolyte secondary cell which exhibits an improved capacity retention after charge-discharge cycles.

DESCRIPTION OF THE PREFERRED EMBODIMENT

The present inventors made intensive studies of the causes of the lowering in the capacity of nonaqueous liquid electrolyte secondary cells, and, as a result of the studies, have found that when an electrode mix slurry is dried at a relatively high temperature, the properties of polyvinylidene fluoride used as the binding agent are apt to be changed, thereby making a high discharge capacity impossible, and the capacity is susceptible to decrease with the repetition of the charge-discharge cycle.

In order to attain the above object, this invention provides a nonaqueous-electrolyte secondary cell comprising a negative electrode 1, a positive electrode 2 and a nonaqueous electrolyte, at least one of the negative electrode 1 and the positive electrode 2 containing a binding agent and an active-material carrier or active material, wherein the binding agent is polyvinylidene fluoride, and the intensity ratio (I1/I2) of a first peak (P1) near a diffraction angle ($2\theta$, where $\theta$ is a Bragg angle) of 17° to a second peak (P2) near a diffraction angle of 18° in an X-ray diffraction pattern obtained with the CuK$\alpha$ radiation for the negative electrode 1 and/or positive electrode 2 containing the binding agent is from 0.3 to 0.6. Suitable drying conditions in producing the electrode containing polyvinylidene fluoride as the binding agent, for example after preparation of an electrode mix slurry, are preferably so set that, as described above, the intensity ratio (I1/I2) of the first peak (P1) to the second peak (P2) in an X-ray diffraction pattern obtained with the CuK$\alpha$ radiation for said electrode is from 0.3 to 0.6. Setting of such drying conditions may be carried out for the negative electrode and/or the positive electrode.

In the negative electrode, the negative electrode active material/carrier which can be doped with an alkali metal, e.g. lithium, and be dedoped of the alkali metal may be formed by use of a carbon material such as cokes, e.g. pitch coke or needle coke, polymers, carbon fibers, graphite materials, and so on. Of such carbon materials, particularly preferred are those carbonaceous materials which have an interplanar distance (d002) (lattice spacing) between (002) planes of at least 3.70Å and a true density of less than 1.70 g/cm$^3$ and which show no heat generation peaks at or above 700° C. when subjected to differential thermal analysis in a stream of air. These carbonaceous materials have very good characteristics for use as a negative-electrode material, and promise a high-capacity cells.

The above carbonaceous materials can be produced by carbonizing, for example, an organic material by use of such methods as sintering at a temperature of about 700° to 1500° C., for instance. Besides, carbon materials are in general classified roughly into carbonaceous materials and graphitic materials, and both types can be used in this invention; however, the carbonaceous materials as described above are preferred.

The starting material for the carbonaceous material is preferably a furan resin constituted of a homopolymer or copolymer of furfuryl alcohol or of furfural. Examples of the furan resins include those polymers which comprise furfural+phenol, furfuryl alcohol+dimethylolurea, furfuryl alcohol, furfuryl alcohol+formaldehyde, furfuryl alcohol+furfural, furfural+ketone, or the like. By sintering such a furan resin, a carbonaceous material having the above-described properties can be obtained.

Alternatively, a petroleum pitch having a hydrogen/carbon atomic ratio of from 0.6 to 0.8 may also be used as a starting material. Carbonaceous materials obtained by subjecting the petroleum pitch to oxygen crosslinking for introduction of oxygen-containing functional groups, thereby obtaining a precursor having an oxygen content of 10 to 20% by weight and then sintering the precursor, also have the properties as described above and are therefore preferable for use in this invention.

In carbonizing the furan resin or the petroleum pitch, it is preferable to add a phosphorus compound or a boron compound to the starting material, since the carbonaceous material obtained in this manner can be doped with a greater amount of lithium.

The active material in the positive electrode may be, for example, a transition metal oxide such as manganese dioxide, vanadium pentoxide, etc., a transition metal chalcogenide such as iron sulfide, titanium sulfide, etc., or a composite compound thereof with lithium, such as compound metal oxides having the general formula: LiMO$_2$, wherein M is at least one of Co and Ni. Of these substances, particularly preferred are lithium-cobalt compound oxides and lithium-cobalt-nickel compound oxides, such as LiCoO$_2$ and LiCo$_{0.8}$Ni$_{0.2}$O$_2$, since they promise high voltage, high energy density and excellent cycle characteristics.

As the nonaqueous electrolyte, for instance, nonaqueous liquid electrolytes obtained by dissolving an electrolyte (a lithium salt) in an nonaqueous solvent (an organic solvent) can be used.

The organic solvent for this use is exemplified by, but not specifically limited to, propylene carbonate, diethoxyethane, $\gamma$-butyrolactone, tetrahydrofuran, 1,3-dioxolan, 4-methyl-1,3-dioxolan, diethyl other, sulfolane, methylsulfolane, acetonitrile, propionitrile, etc. These organic solvents may be used either singly or in combination of two or more.

As the electrolyte to be dissolved in the organic solvent, also, any of those electrolytes which have been conventionally known can be used, for example, LiClO$_4$, LiAsF$_6$, LiPF$_6$, LiB(C$_6$H$_6$H$_5$)$_4$, LiCl, LiBr, CH$_3$SO$_3$Li, CF$_3$SO$_3$Li, etc.

The above nonaqueous electrolyte may be a solid. For instance, a high molecular weight complex solid electrolyte may be used.

When the intensity ratio (I1/I2) of the first peak (P1) to the second peak (P2) in an X-ray diffraction pattern obtained with the CuK$\alpha$ radiation for the negative electrode and/or positive electrode containing the binding agent is restricted as described above, polyvinylidene fluoride used as the binding agent shows stable characteristics without deterioration in properties, so that an improvement in the charge-discharge cycle characteristics of the cell can be contrived.

This invention will now be explained below in detail with reference to the drawings.

EXAMPLE 1

Figure 2:
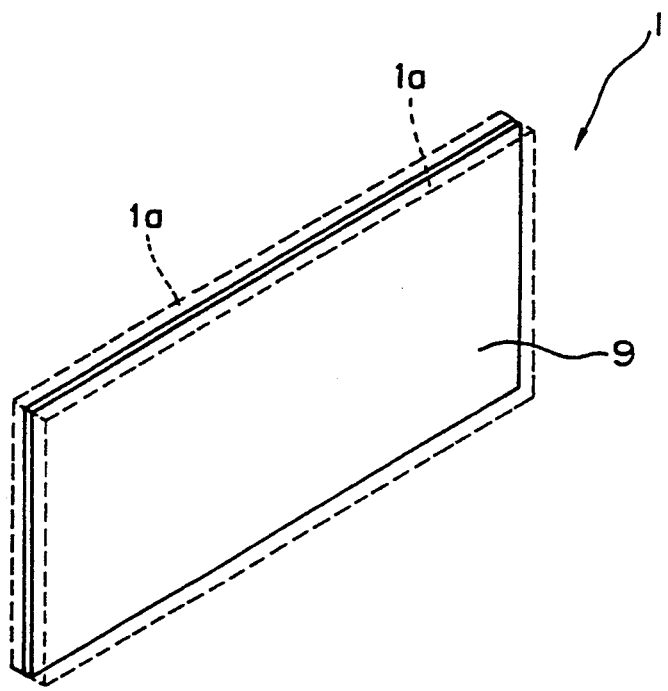
FIG. 2 is a perspective view showing a web form negative electrode, before fabrication of a wound electrode body in the cell shown in FIG. 1.

FIG. 1 is a schematic vertical sectional view of a nonaqueous-electrolyte secondary cell according to this embodiment, and FIG. 2 is a perspective view of a web form negative electrode which can be used for the cell. The cell was assembled as follows.

First, the negative electrode 1 was fabricated as follows. Petroleum as a starting material was subjected to oxygen crosslinking for introducing 10 to 20% by weight of oxygen-containing functional groups into the starting material, to give an oxygen-crosslinked precursor. The crosslinked precursor was sintered 1000° C. in a stream of an inert gas, to obtain a carbonaceous material having properties similar to those of glassy carbon.

On X-ray diffraction analysis, the carbonaceous material was found to have an interplanar distance (d002) between (002) plane of 3.76 Å. The true specific density of the carbonaceous material was determined pycnometrically to be 1.58 g/cm$^3$. Further, when subjected to differential thermal analysis in an air stream, the material showed no heat generation peaks at or above 700° C. The carbonaceous material was ground to be a powdered carbonaceous material with an average particle diameter of 10 μm.

The carbonaceous material thus obtained was used as a carrier for a negative electrode-active material. Namely, 90 parts by weight of the powder of the carbonaceous material was mixed with 10 parts by weight of polyvinylidene fluoride (PVDF) used as a binding agent, to prepare a negative electrode mix. The electrode mix was dispersed in N-methyl-pyrrolidone, used as a solvent, to prepare a slurry (pasty matter).

Next, the negative electrode mix slurry was applied uniformly to both sides of a negative electrode collector 9 composed of a 10 μm thick web form copper foil. The slurry was then dried in a natural convection type electric dryer at 90° C. so as to evaporate off the solvent therefrom. After the drying, compression molding was carried out with a roller press to obtain a web form negative electrode 1 having a negative electrode mix layer 1a on each side of the negative electrode collector 9, as shown in FIG. 2. The above drying was carried out under natural convection of air in the natural convection type electric dryer, while maintaining the ambient temperature inside the dryer at 90° C. by using a set temperature of 90° C.

Both of the negative electrode mix layers 1a thus formed on opposite sides had the same film thickness of 80 μm, and the web form negative electrode 1 was 41.5 mm in width and 280 mm in length.

The negative electrode mix layers 1a of the negative electrode 1 were analyzed by X-ray diffraction as follows. As an apparatus for X-ray diffraction analysis, a Model RAD-IIC apparatus produced by Rigaku Denki K.K. was used with a Cu target as an X-ray source and with a graphite monochromator. Slit settings were DS (diverging slit)=1°, RS (receiving slit)=0.6 mm, and SS (scattering slit)=1°. A scanning rate of 0.5/min was employed with a tube voltage of 40 kV and a tube current of 30 mA.

Figure 3:
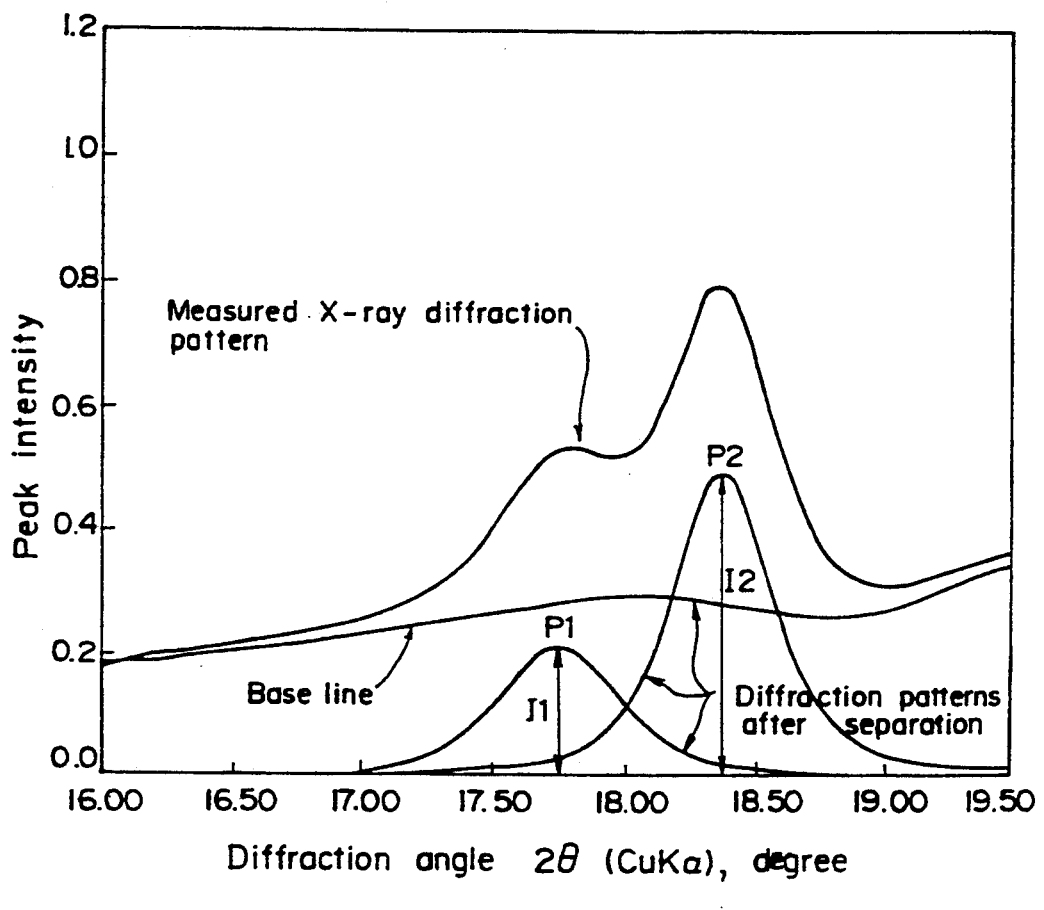
FIG. 3 is a diagram showing a X-ray diffraction pattern measured for the negative electrode in one embodiment of this invention, and diffraction patterns obtained by separating the measured X-ray diffraction pattern into components.

The X-ray diffraction pattern obtained by the analysis is shown in FIG. 3. The X-ray diffraction pattern thus measured was separated by a least-square method of successive approximation into diffraction peaks and a base line (including halos of noncrystalline origin), as shown in FIG. 3, and the peak intensities (I1 and I2) of a first peak (P1) near a diffraction angle (=2θ, where θ is a Bragg angle) of 17.7° and a second peak (P2) near a diffraction angle of 18.5° were read therefrom, regarding the peaks as single waveforms. From the values thus read, the intensity ratio (I1/I2) defined as the ratio of the peak intensity (I1) of the first peak (P1) to the peak intensity (I2) of the second peak (P2) was calculated. Other diffraction peaks may appear in the vicinity of the first peak (P1) or the second peak (P2), according to the materials used for the electrode; in such cases, it is recommandable to separate the other diffraction peaks as well, from the peak (P1 or P2) of interest, before calculating the intensity ratio (I1/I2).

In the manner as described above, the intensity ratio (I1/I2) for the negative electrode mix layers 1a of the negative electrode 1 was determined to be 0.375.

A positive electrode 2 was produced as follows. A mixture of 0.5 mole of lithium carbonate and 1 mole of cobalt carbonate was prepared, and sintered in air at 900° C. for 5 hours to obtain $LiCoO_2$.

Ninety-one (91) parts by weight of the thus obtained $LiCoO_2$, as a positive electrode-active material, was admixed with 6 parts by weight of graphite, as a conducting agent, and 3 parts by weight of polyvinylidene fluoride, as a binding agent, to prepare a positive electrode mix. The positive electrode mix was dispersed in N-methyl-2-pyrrolidone solvent to prepare a slurry (pasty matter).

The positive electrode mix slurry thus obtained was then applied uniformly to both sides of a positive electrode collector 10 composed of a web form aluminum foil 20 μm in thickness. The solvent in the electrode mix was evaporated off by drying at 120° C. in a natural convection type electric dryer. After the drying, compression molding was carried out in a roller press, to obtain a web form positive electrode 2 having a positive electrode mix layer 2a on each side of the positive electrode collector 10.

Both of the positive electrode mix layers 2a thus formed on opposite sides had the same film thickness of 80 μm, and the web form positive electrode 2 was 39.5 mm in width and 230 mm in length.

The web form negative electrode 1 and the web form positive electrode 2, fabricated as above, and a pair of web form separators 3a and 3b each formed of a microporous polypropylene film with a thickness of 25 μm and a width of 44 mm were laminated with each other in the order of the negative electrode 1, separator 3a, positive electrode 2 and separator 3b. The laminate electrode body of the four-layer construction thus obtained was spirally wound many times along the longitudinal direction thereof, with the negative electrode 1 on the inner side, to form a wound electrode body 15. The outermost, terminal end portion of the thus wound electrode body 15 was fixed by an adhesive tape.

The wound electrode body 15 was 3.5 mm in inside diameter at its central hollow portion, and was 13.9 mm in outside diameter. Besides, a core 33 was disposed in the hollow portion.

The spirally wound electrode body 15 fabricated as above was encased in a cell can 5 made of nickel-placed iron, as shown in FIG. 1.

For current collection at the negative electrode 1 and the positive electrode 2, a negative electrode lead 11 of nickel was preliminarily attached to the negative electrode collector 9, led out from the negative electrode 1 and welded to the bottom face of the cell can 5. On the other hand, a positive electrode lead 12 of aluminum was preliminarily attached to the positive electrode collector 10, led out from the positive electrode 2 and welded to a projected portion 34a of a metallic safety valve 34.

Thereafter, a nonaqueous electrolyte solution prepared by dissolving 1 mol/l of lithium salt $LiPF_6$ in a mixed solvent composed of equal amounts of propylene carbonate and 1,2-dimethoxyethane was charged into the cell can 5, thereby impregnating the wound electrode body 15 with the electrolyte solution.

Before or after this operation, circular disklike insulator plates 4a and 4b were placed in the cell can 5 oppositely to the upper and lower end surfaces, respectively, of the wound electrode body 15.

Subsequently, the cell can 5, the safety valve 34 and a metallic cell cap 7, the latter two being in close contact at peripheral portions thereof, were caulked against each other through an asphalt-coated insulating sealing gasket 6, so as to seal the cell can 5. The cell cap 7 and the safety valve 34 were thereby fastened, and the interior of the cell can 5 was kept airtight. In this condition, the lower end (as viewed in FIG. 1) of the gasket 6 makes contact with a peripheral surface portion of the insulator plate 4a, whereby the insulator plate 4a is held in close contact with an upper portion of the wound electrode body 15.

In this manner, a cylindrical nonaqueous-electrolyte secondary cell, 14 mm in diameter and 50 mm in height, was produced. As shown in Table 1 below, the cell obtained in this Example 1 will be referred to as Cell A, for convenience.

The cylindrical nonaqueous-electrolyte secondary cell as above comprises the safety valve 34, a stripper layer 36 and an intermediate fitting member 35 formed of an insulating material and serving to unite the safety valve 34 and the stripper layer 36, for constituting a double safety device. Though not shown, the safety valve 34 is provided with a cleaving portion which will cleave upon deformation of the safety valve 34, and the cell cap 7 is provided with a hole.

This arrangement is so designed that if the pressure inside the cell is raised by some cause, the safety valve 34 will be deformed upward (in FIG. 1) at and around the projected portion 34a to disconnect the positive electrode lead 12 and the projected portion 34a from each other, thereby cutting off the cell current, or, alternatively, the cleaving portion of the safety valve 34 will cleave so as to release the gas, if any, generated in the cell.

As the solvent for preparing the negative electrode mix slurry or the positive electrode mix slurry, a variety of solvents can be used, provided that polyvinylidene fluoride used as the binding agent is soluble therein. Examples of the usable solvents include ketones such as methyl ethyl ketone, cyclohexanone, etc.; esters such as methyl acetate, methyl acrylate, etc.; amides such as dimethylformamide, dimethylacetamide, N-methylpyrrolidone, etc.; amines such as diethyltriamine, N,N-dimethylaminopropylamine, etc.; cyclic others such as ethylene oxide, tetrahydrofuran, etc.; and so on.

EXAMPLE 2

A cylindrical nonaqueous-electrolyte secondary cell was produced in the same manner as in Example 1 except that the drying temperature for a negative electrode mix slurry in fabricating a negative electrode 1 was 120° C. As shown in Table 1 below, the cell thus obtained will be referred to as Cell B. The intensity ratio (I1/I2) for the negative electrode 1 was determined, in the same manner as in Example 1, to be 0.377.

EXAMPLE 3

A cylindrical nonaqueous-electrolyte secondary cell was produced in the same manner as in Example 1 except that the drying temperature for a negative electrode mix slurry in fabricating a negative electrode 1 was 140° C. This cell will be referred to as Cell C, as shown in Table 1 below. The intensity ratio (I1/I2) for the negative electrode 1 was determined, in the same manner as in Example 1, to be 0.432.

EXAMPLE 4

A cylindrical nonaqueous-electrolyte secondary cell was produced in the same manner as in Example 1 except that the drying temperature for a negative electrode mix slurry in fabricating a negative electrode 1 was 170° C. As shown in Table 1 below, the cell thus obtained will be referred to as Cell D. The intensity ratio (I1/I2) for the negative electrode 1 was determined, in the same manner as in Example 1, to be 0.532.

COMPARATIVE EXAMPLE

As a comparative example for confirming the effects of this invention, a cell was produced as follows. That is, a cylindrical nonaqueous-electrolyte secondary cell was produced in the same manner as in Example 1 except that the drying temperature for a negative electrode mix slurry in fabricating a negative electrode 1 was 190° C. This cell will be referred to as Cell E, as shown in Table 1 below. The intensity ratio (I1/I2) for the negative electrode 1 was determined, in the same manner as in Example 1, to be 0.610.

The five kinds of Cells A, B, C, D and E obtained as above were subjected to repeated charge-discharge cycles. The charge-discharge cycle consisted in 2-hour charging at a fixed current of 500 mA with an upper limit of charge voltage of 4.1 V, followed by discharging to a finish voltage of 2.75 V under a load of 18 Ω. For each of the cells, the capacity upon 10 charge-discharge cycles was measured as an initial capacity, and the discharge capacity upon 100 cycles was also measured. For each cell, further, the ratio of the discharge capacity upon 100 cycles to the initial capacity, i.e., (capacity upon 100 cycles)/(initial capacity), was calculated as a retention of capacity. The results are given in Table 1 below.

TABLE 1

| Cell | Capacity upon 10 cycles (initial capacity) (mAh) | Capacity upon 100 cycles (mAh) | Retention of capacity (%) | Intensity ratio of peaks (I1/I2) |
| --- | --- | --- | --- | --- |
| A | 346 | 306 | 88.4 | 0.375 |
| B | 340 | 300 | 88.2 | 0.377 |
| C | 340 | 297 | 87.4 | 0.432 |
| D | 334 | 280 | 83.8 | 0.532 |
| E (Comp. Ex.) | 332 | 242 | 72.9 | 0.610 |

Figure 4:
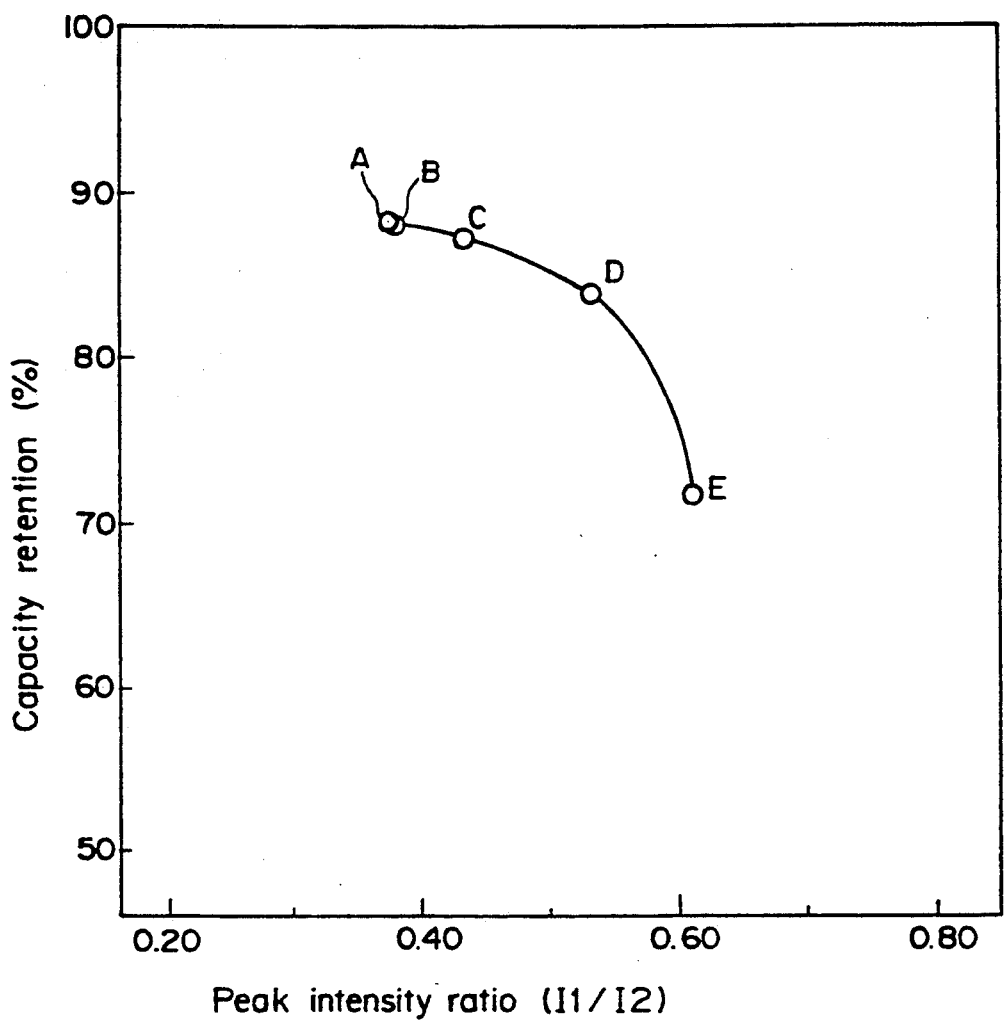
FIG. 4 is a diagram showing the relationship between peak intensity ratio (I1/I2) for negative electrode and retention of cell capacity, for the cells according to embodiments of this invention.

FIG. 4 shows the relationship between the peak intensity ratio (I1/I2) and the retention of capacity, for Cells A to E. Marked with A to E in FIG. 4 are the respective data on Cells A to E.

It is seen from Table 1 and FIG. 4 that Cells A to D obtained respectively in Examples 1 to 4 are high in capacity and can retain the high capacity. Namely, Cells A to D according to this invention are slightly higher in initial capacity, considerably higher in capacity upon 100 charge-discharge cycles, higher in retention of capacity and hence superior in charge-discharge cycle characteristics, as compared to Cell E of the comparative example. It is also understood that the retention of capacity decreases with an increase in the peak intensity ratio (I1/I2), and is considerably lowered when the peak intensity ratio (I1/I2) exceeds 0.6. These results indicates that the lowering of the cell capacity attendant on the charge-discharge cycles in the nonaqueous-electrolyte secondary cells can be prevented by controlling the peak intensity ratio to within the range of from 0.3 to 0.6; preferably from 0.3 to 0.55.

Although the drying for evaporating off the solvent after application of the negative electrode mix slurry in fabricating the negative electrode 1 in the above embodiments has been carried out by use of a natural convection type electric dryer, the drying can be carried out also by use of an infrared oven, a far infrared irradiation type dryer, an induction heating type dryer, a forced hot air circulation type dryer, a vacuum dryer, an atmospheric oven, etc.

In addition, when an electrode is produced in the above manner after preparing an electrode mix slurry by using polyvinylidene fluoride as a binding agent, it is preferable to set the drying conditions for the electrode mix slurry so that the peak intensity ratio (I1/I2) of the first peak (P1) to the second peak (P2) in an X-ray diffraction pattern obtained with the $CuK\alpha$ radiation for the resulting electrode will be in the range from 0.3 to 0.6.

The above drying conditions include, in addition to the drying temperature, other various conditions such as method of drying (apparatus for drying), method of temperature control (whether the ambient temperature is controlled or the actual electrode temperature is controlled, etc.), drying atmosphere and so on. As a result of the present inventors' studies, it has been revealed that these conditions may be appropriately set according to the drying method or the like so as to control the peak intensity ratio (I1/I2) into the range from 0.3 to 0.6 as described above, whereby the drawbacks of the prior art associated with drying of an electrode mix slurry containing polyvinylidene fluoride can be overcome.

Besides, although the diffraction pattern measurements and investigations have been made as to the negative electrode 1 in the above embodiments, the same effect as above can also be obtained by controlling the peak intensity ratio (P1/P2) for the positive electrode 2 to within the range from 0.3 to 0.6.

Furthermore, the cells according to the above embodiments have been described as being cylindrical nonaqueous-electrolyte secondary cells using a spirally wound electrode body, but this invention is not limited to such cells. For example, the nonaqueous-electrolyte secondary cell according to this invention may take a tubular or columnar form with a polygonal cross section. Also, this invention is applicable to button type or coin type nonaqueous-electrolyte secondary cells.

According to the nonaqueous-electrolyte secondary cell of this invention, a higher capacity can be contrived and the lowering in capacity attendant on repeated charge-discharge cycles can be reduced, by restricting the intensity ratio between two peaks in an X-ray diffraction pattern for the negative and/or the positive electrode which contains polyvinylidene fluoride as a binding agent. It is therefore possible to provide a nonaqueous-electrolyte secondary cell having a high capacity and excellent charge-discharge cycle characteristics, in addition to such characteristic features as low weight and high energy density which have been conventionally known to be possessed by nonaqueous-electrolyte secondary cells.

We claim as our invention:

1. A nonaqueous-electrolyte secondary cell comprising a negative electrode, a positive electrode and a nonaqueous electrolyte, at least one of the negative and positive electrodes containing a binding agent and an active-material carrier or active material, wherein
    the binding agent is polyvinylidene fluoride;
    the ratio of the intensity of a first peak near a diffraction angle ($2\theta$, where $\theta$ is a Bragg angle) of 17.7° to the intensity of a second peak near a diffraction angle of 18.5° in an X-ray diffraction pattern obtained with the $CuK\alpha$ radiation for the negative and/or positive electrode containing the binding agent is from 0.3 to 0.6; and said one electrode is formed by drying a slurry of said binding agent, under controlled drying conditions to produce said intensity ratio.

2. A nonaqueous-electrolyte secondary cell according to claim 1, said ratio is from 0.3 to 0.55.

3. A nonaqueous-electrolyte secondary cell according to claim 1, said negative electrode is formed of an electrode mix provided on a negative electrode collector, said electrode mix is formed of carbonaceous material as said active material carrier and the binding agent.

4. A nonaqueous electrolyte secondary cell according to claim 1, said positive electrode is formed of an electrode mix provided on a positive electrode collector, said electrode mix is formed of $LiMo_2$, wherein M is at least one of Co and Ni, as said active material and the binding agent.

* * * * *